Sept. 23, 1930. A. M. YOUNG ET AL 1,776,606
TEMPERATURE INDICATOR FOR WAFFLE IRONS
Filed Dec. 11, 1929
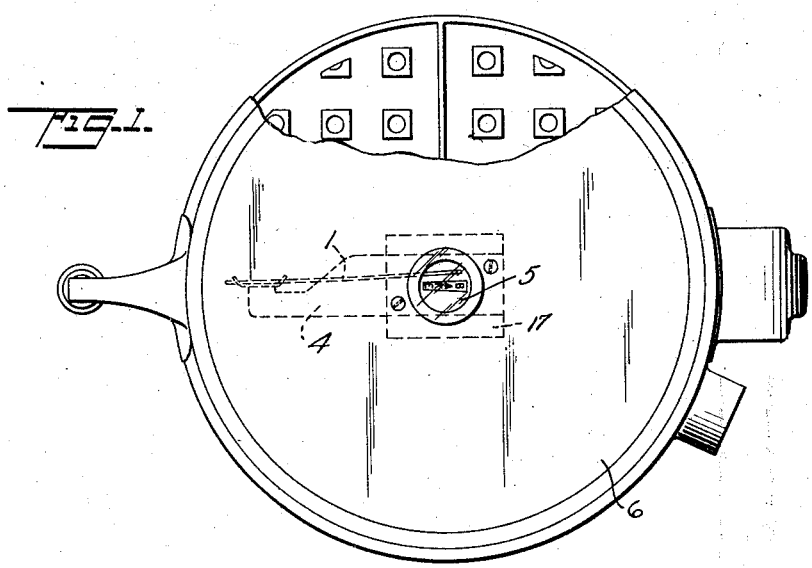
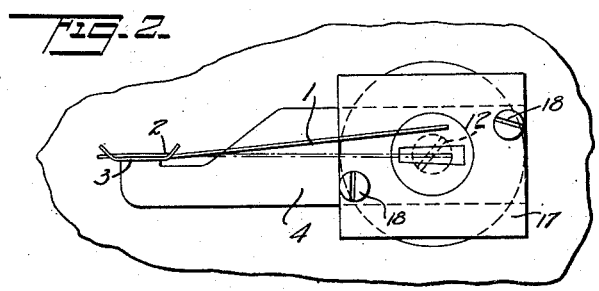
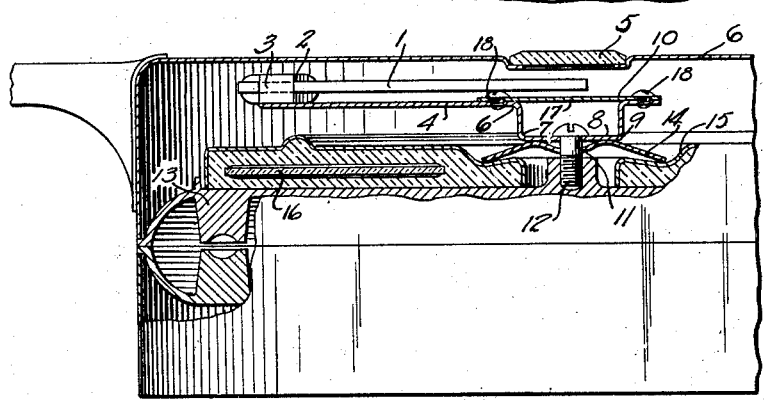
INVENTORS
Allan M. Young
Frederick W. Cuffe
ATTORNEYS Patented Sept. 23, 1930

1,776,606

UNITED STATES PATENT OFFICE

ALLAN M. YOUNG AND FREDERICK W. CUFFE, OF MERIDEN, CONNECTICUT, ASSIGNORS TO MANNING, BOWMAN & CO., OF MERIDEN, CONNECTICUT, A CORPORATION OF DELAWARE

TEMPERATURE INDICATOR FOR WAFFLE IRONS

Application filed December 11, 1929. Serial No. 413,211.

The present invention relates to a temperature indicator for waffle irons and comprises a temperature responsive device of relatively simple construction adapted to indicate when the temperature of the iron has reached a predetermined value, which value may conveniently be that at which the waffle batter should be poured into the mould.

The invention is of particular value when the moulds or grids of the waffle iron are of aluminum, as such grids have but a relatively small temperature range suitable for baking. It is well known that the waffles made when an iron is first heated stick to the grid because the batter has been inserted while the iron is still too cold. Also, after the iron has been used for some time, the temperature increases beyond that suitable for baking, and again the waffles are apt to stick to the moulds. By means of the present invention the uncertainty accompanying the baking of waffles on such irons is substantially eliminated as means are provided for indicating when the temperature is within the suitable range for baking.

The novel indicating device is of relatively simple construction. It is adapted to be readily incorporated into known types of waffle irons without necessitating modification of the design of the iron and with relatively small additional expense.

For an understanding of the invention and of the manner in which it may be used, reference should be had to the accompanying drawings, of which:

Fig. 1 is a top plan view of a waffle iron provided with a temperature indicating device constructed according to the invention, the cover of the iron being shown partly broken away to disclose the lower grid;

Fig. 2 is a top plan view of the indicating device of Fig. 1; and

Fig. 3 is a partial side view, partly in section, of the waffle iron of Fig. 1.

In the drawings, an electric waffle iron of known design and construction is shown provided with the novel temperature indicating device of the invention. This device comprises a bi-metallic strip 1 mounted at one end in slots 2 in an upstanding portion 3 of a metal bracket 4 and having its other end free to move beneath a window 5 provided in the center of the casing 6 of the iron. The bracket 4 remote from the upstanding portion 3 is bent downward at 6 through a right angle, is bent forward at 7 to give a flat portion 8 parallel to the main body of the piece and bent upwardly at 9 and again horizontally at 10. The portion 8 has a hole 11 drilled therein for the reception of the screw 12. Screw 12 is threaded into the upper aluminum grid 13 and passes through a hole in a collar plate 14, which plate bears against the plate 15 covering the upper heating element 16 of the waffle iron. By passing screw 12 through the hole 11, the screw may be utilized for supporting the temperature indicator and for maintaining the same in good thermal contact with the heated portions of the iron, as well as for its usual function of maintaining the heating element 16 and grid 13 in contact. Cooperating with the bi-metallic element 1 is a small plate 17 which is mounted on the upper horizontal portions of the bracket 4 in such position as to bridge the depressed portion 8. Plate 17 is fastened to the bracket 4 in any convenient manner, as by screws 18 passing through holes in the plate, and threaded into matching holes in the bracket 4. The plate 17 has engraved thereon the word "Bake", written with the letters in a vertical column and so disposed with respect to the window 5 as to be visible therethrough. The arrangement of the element 1, with the plate 17, is such that when the iron is cold the free end of the element does not lie over the word "Bake" on the plate 17, but when the iron is at the correct temperature for the addition of batter to the grid, the differential expansion of the metals of the element causes the free end thereof to move over the word "Bake" to disclose through the window that the desired temperature has been reached.

It will be noted that the described temperature indicator necessitates but the addition of a window in the top casing of the waffle iron and of the unitary structure comprising the element 1, metal bracket 4 and plate 17 between the top casing and upper cover plate of the iron. The added parts are of simple construction. No increase in the size of the iron is necessitated, nor is any modification needed of the internal parts of the iron. The indicator being located substantially at the center point of the iron, and being in contact with the grid, gives an accurate measure of the temperature of the iron. The bi-metallic element being itself used to indicate the temperature, the provision of an additional indicating needle is made unnecessary.

By positioning the temperature responsive device within the large dead air space or chamber with the bimetallic element and bracket spaced from the walls of the chamber and the bracket secured to the upward projection formed on the grid, although the device is located remote from the grid for convenience of observation, it is responsive quickly and accurately to variations in the temperature of the grid both during the initial heating of the iron and during continued used thereof.

The following is claimed:

1. A waffle iron having, in combination, an upper grid, a heating device extending over the grid, a cover plate extending over the heating device, a top casing for the iron extending over the cover plate and grid and together therewith providing a closed chamber, said grid having a projection extending upwardly through an opening in said cover plate, a thermostatic device comprising a bracket secured to said projection, a dial mounted on the bracket, a bi-metallic element having one end secured to the bracket and its other end free to move over the dial, said element and bracket being spaced from the walls of said chamber, and a window in the top casing through which the element and dial may be observed.

2. In a waffle iron provided with a top casing, with upper and lower heating devices and with upper and lower aluminum grids, a metal bracket mounted on said upper grid and in thermal contact therewith, a bi-metallic element having one end mounted on said bracket and having its other end free to move upon differential contraction or expansion of the metals thereof, a plate mounted on said bracket under the path of movement of the free end of said element and having indicating marks thereon, and a window in said top casing located over the path of motion of the free end of said element and disclosing the indicating marks on said plate therethrough.

3. The construction according to claim 2 wherein the relative positions of said element and said plate are so chosen that the free end of the element will lie over said indicating marks when the iron has reached a temperature suitable for use.

4. In a heating device provided with a top casing and a heating plate spaced therefrom so as to form a closed chamber, a metal bracket mounted in said chamber and in thermal relation to said plate, a bi-metallic element having one end mounted on said bracket and having its other end free to move upon differential contraction or expansion of the metals thereof, a plate mounted on said bracket under the path of movement of the free end of said element and having indicating marks thereon, and a window in said top casing located over the path of motion of the free end of said element and disclosing the indicating marks on said plate therethrough.

5. In combination with a waffle iron provided with a top casing and with an upper grid and a heating device therefor held together by a collar and screw, a temperature indicator mounted on said screw between said top casing and said heating plate, and a window in said top casing adapted to disclose said indicator therethrough.

In testimony whereof, we have signed our names to this specification.

ALLAN M. YOUNG.
FREDERICK W. CUFFE.